March 1, 1949.  A. A. FLASTER  2,463,370
PRODUCTION OF ORNAMENTAL IMPRESSED DESIGNS
ON THERMOPLASTIC MATERIALS
Filed April 3, 1946   3 Sheets-Sheet 1
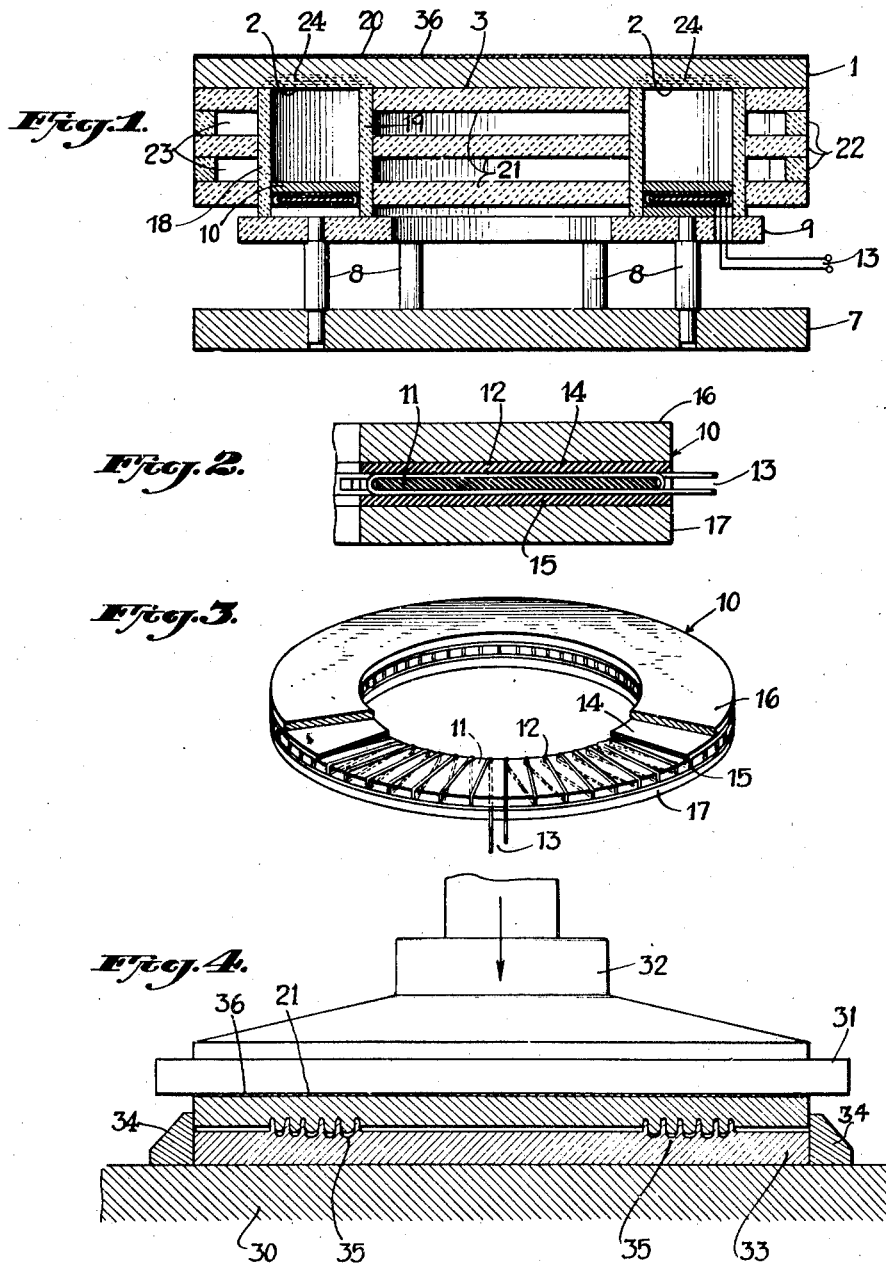
INVENTOR.
ALFRED A. FLASTER.
BY
ATTORNEYS.

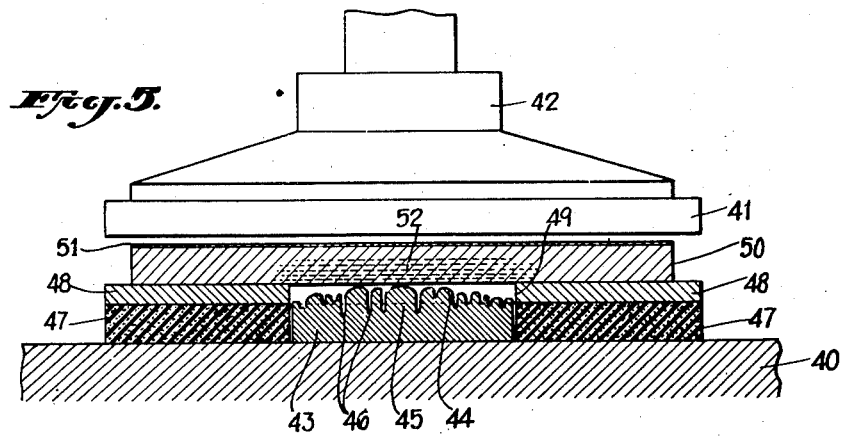
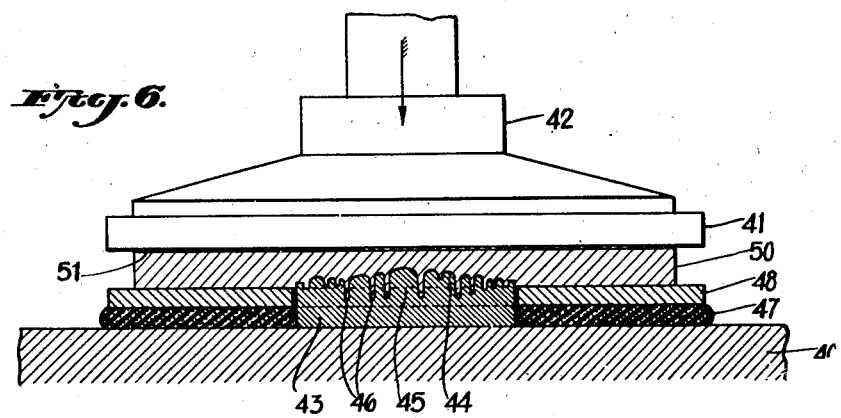
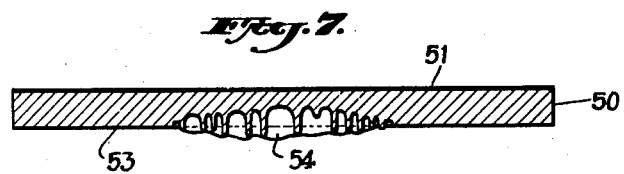
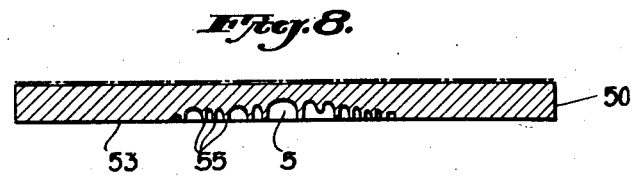

March 1, 1949.  A. A. FLASTER  2,463,370
PRODUCTION OF ORNAMENTAL IMPRESSED DESIGNS
ON THERMOPLASTIC MATERIALS
Filed April 3, 1946  3 Sheets-Sheet 3

INVENTOR.
ALFRED A. FLASTER.
BY
ATTORNEYS.

UNITED STATES PATENT OFFICE 2,463,370

PRODUCTION OF ORNAMENTAL IMPRESSED DESIGNS ON THERMOPLASTIC MATERIALS

Alfred A. Flaster, New York, N. Y.

Application April 3, 1946, Serial No. 659,406

9 Claims. (Cl. 18—56)

This invention pertains to improvements in processes for making articles of transparent, translucent or opaque, thermoplastic resins, having permanently impressed therein fine, detailed, ornamental designs or pattern effects.

Objects of the invention are to produce in articles, such as sheets, rods, tubes or other formed shapes, made of transparent, translucent or opaque thermoplastic materials, and by relatively economical and expeditious mass-production methods, permanently impressed complex ornamental designs, simulating the effects heretofore found only in the most expensive, hand-made or hand-cut glassware or marble products, such as cut glass, or glassware of the "Lalique" or "Intaglio" types, or glassware or marble products embodying hand-cut or carved intaglio or cameo impressions or embossments.

The thermoplastic resins, particularly the clear or transparent varieties, such as the polystyrene, acrylate or methacrylate types, etc., are assuming an ever-increasing competitive position in the industries as a substitute for glass and other vitreous products, by reason of their tough and non-shatterable physical characteristics, relative ease and economy of manufacture and fabrication by molding into articles of various shapes.

In line with the trend to substitute plastic products or articles of the character aforesaid, for glass, ceramic or other vitreous products, attempts have been made at ornamentation of the thermoplastic products. For example, resort has been made to sand-blasting, hand-carving, mechanical milling operations, etc., but such procedures are unduly expensive and hence restricted to relatively simple designs. Also, ornamental effects have been obtained by painting, stenciling, printing or otherwise applying pigmented or painted patterns, but these are restricted to surface effects which soon become marred and destroyed by wear.

Attempts have also been made to produce ornamental designs in thermoplastic articles and the like, by softening the plastic material of the entire structure, as by placing in ovens or otherwise heating throughout to the point of plasticity. However, the resulting plasticized article, when subjected to pressure of a die for impressing the design therein, immediately warps and blisters, and the surface, due to the pressure, assumes an opaque or "oatmeal-like" appearance. Also, the article, due to the fact that it has been completely softened by heat throughout, will tend to flatten out or otherwise deform from its initial shape and thickness, during the pressing operation, and hence will fail to take a sharply delineated impression, and also will undergo discoloration, an effect particularly noticeable in the case of transparent thermoplastic articles.

For reasons such as the above, no commercially feasible method or means has heretofore been devised, in so far as I am aware, for imparting to thermoplastic articles, irrespective of their sizes or shapes, and by relatively cheap mass-production procedures, the highly intricate, ornamental designs and permanently impressed or embodied pattern effects simulating the effects aforesaid, heretofore found only in expensive, hand-made or hand-cut or carved glassware or marble, such as the "lalique," or "intaglio," "cameo" or other cut-glass and related pattern effects.

In accordance with my invention, I have devised procedures for accomplishing these desirable results, wherein a single set of engraved dies may be employed for embodying intricate designs, of the character above mentioned, in all shapes and varieties of finished, thermoplastic articles, and without in any wise marring or impairing the initial appearances of such articles as regards such factors as transparency, surface finish, etc., while at the same time greatly enhancing the appearances thereof by virtue of the delicate ornamentations embodied therein as a result of my invention.

In accordance with the basic principles of my invention, I produce the ornamental pattern effects aforesaid in thermoplastic articles, by first locally heating the plastic material of the article, on that side only and over that area only where the ornamental design is to be applied, and continuing said heating only for a sufficient duration to plasticize the material over that area and to only the depth therein to be impressed or embossed by the ornamental design, while meantime maintaining all other portions, including the opposite surface of said article, at a sufficiently low temperature to retain such portions in a firm and hard state, thereby to avoid any surface marring, warping, or other injury to the article, while the design is being embodied therein and also to prevent any flow of the plastic material outside the area into which the design is to be impressed. Thereupon, I immediately embody the selected design in the thus locally heated and plasticized portion, by impressing therein one or more deeply engraved metal plates or dies.

More specifically, and in accordance with one embodiment of my invention, the metal dies employed are engraved to a certain depth, but are impressed in the plastic material to a depth materially less than that of the engraving in the die, thereby to provide spaces in the die concavities into which the plastic material displaced by the protuberances thereof may flow, during the pressing operation. In accordance with this procedure, the plastic sheet will have taken the impression of the design in such manner, due to the nature of the plastic, that the design will be sharp and clear at the points of deepest penetration of the embossing tool, but, again owing to the nature of the plastic material and, in addition, due to the fact that the embossing tool has not been forced into the plastic to the maximum depth of the engraving thereon, the protuberances or outer contours of the design will be softly curved and have smoothly rounded contours, thereby simulating the effect of "lalique" glassware.

A second embodiment of the invention involves the use of relief dies which are engraved to correspond to the precise configuration and contours of the ornamental design to be impressed in the plastic material, and which, in addition, are engraved to considerably greater depths in the concavities or recessed portions of the die, in order to provide spaces into which the excess plastic material may flow during the pressing operation, which excess material is subsequently ground away as explained below. In employing dies of this character in accordance with said second embodiment of my invention, the dies are impressed into the locally preheated and plasticized portion of the thermoplastic article, to the full depth of the design engraved in the die, in consequence of which the excess and displaced plastic material, which flows into the deep recesses or concavities of the die, will project beyond the original surface contour of the plastic article after the pressing operation and following removal of the die. This excess plastic material is thereupon ground away to the original surface contour of the article or sheet, and the so-ground surface portions thereupon polished, if desired. In this way, an intaglio design is obtained in the plastic article, having an extremely sharply delineated pattern at the original flat surface of the material, in consequence of which the design presents the appearance of having been hand-engraved or hand-carved into the hard, flat plastic surface. Accordingly, the design thus obtained closely simulates in plastics the intaglio effects heretofore obtainable only in expensive glassware and the like and only by the employment of highly skilled artists employing hand-carving or engraving methods. The plastic article presents, as stated, an intaglio design when viewed from the surface in which the design is impressed, but has the appearance of a cameo ornamentation when viewed through the clear, transparent resin from the opposite surface thereof. This intaglio or cameo effect may be greatly enhanced, in accordance with the invention, by coating the impressed areas with mother-of-pearl to produce an iridescent effect, or, alternatively, with pigments or tints to produce equally pleasing solid or translucent effects.

Referring now to the drawings for a more detailed description of the invention:

Fig. 1 is a view in sectional elevation of an appropriate form of apparatus, for locally preheating in accordance with the invention a thermoplastic article to be ornamented, in such manner as to confine the preheating and consequent plasticizing of the article over that area only and to that depth only in which the design is to be impressed.

Fig. 2 is a sectional detail, in elevation, of the heating unit proper; while Fig. 3 is a perspective view of the heating unit proper, with portions cut away more clearly to reveal the component construction thereof.

Fig. 4 is a view in sectional elevation through a suitable apparatus employed for impressing the ornamental design in the locally preheated and plasticized portion of the thermoplastic article, and in accordance with the first modification of the invention above mentioned, wherein the engraved die is impressed in the plastic material to a depth materially less than the total depth of engraving in the die.

Figs. 5 and 6 are sectional elevations, corresponding to Fig. 4, but illustrating suitable apparatus for impressing ornamental designs into thermoplastic articles in accordance with the second modification of the invention above noted, according to which the die is impressed into the plastic material to the full depth of the design engraved therein, but wherein the die is, in addition, engraved to a considerably greater depth in the concavities or recesses thereof, thereby to provide spaces into which the excess plastic material may flow during the pressing operation. Fig. 5 shows, in sectional elevation, the relative dispositions of the components of the pressing apparatus just prior to the pressing operation; while Fig. 6 is a corresponding view of the apparatus at the end of the pressing operation.

Fig. 7 is a view, in sectional elevation, of the thermoplastic article which results from the pressing operation illustrated in Figs. 5 and 6, this sectional view being taken through the ornamental design impressed in the article, and illustrating the projection of the excess plastic material beyond the initial surface contour of the plastic article. Fig. 8 is a sectional elevation of the Fig. 7 product, but showing the appearance of the article after the aforesaid excess plastic material has been ground away and the surface polished down to the initial surface contour of the plastic article.

Figure 9:
Figure 10:
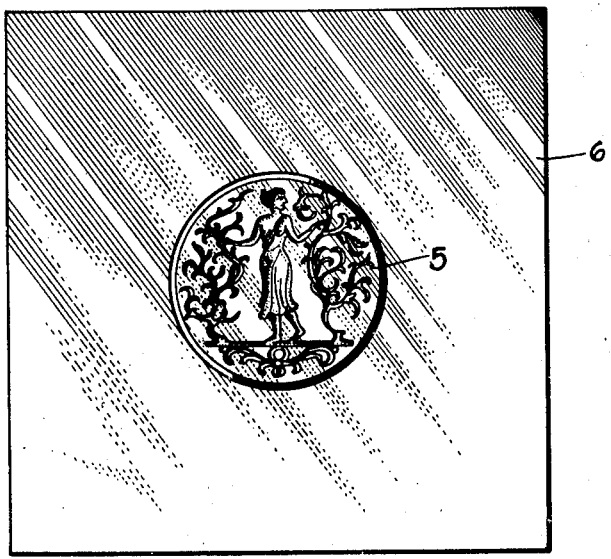

Fig. 9 is a plan view of the ornamented thermoplastic article, as obtained in accordance with the pressing operation illustrated in Fig. 4; while Fig. 10 is a corresponding view of an ornamented thermoplastic article such as results from the pressing operation illustrated in Figs. 5 and 6, followed by the grinding and polishing operations above referred to in connection with Figs. 7 and 8.

Referring to Figs. 1 to 3 inc., the particular form of heating unit therein shown is adapted to locally heat a thermoplastic article, such as a sheet of thermoplastic resin 1, over an annular area 2 of one surface 3 thereof, for purposes of impressing therein an ornamental design, such as that illustrated at 4 in Fig. 9. Although slight modifications of the apparatus are of course required for confining the localized heating to other and different ornamental design areas, such as that illustrated at 5 in the thermoplastic sheet 6 of Fig. 10, the general construction and operation of the heating apparatus is the same for all such modifications, with the exceptions noted below:

Thus, the heating apparatus comprises a metal base 7, in appropriate apertures of which are mounted upstanding lugs, as at 8, which in turn support an annular ring 9, of heat-insulating refractory material, such as asbestos. The heata lower, stationary press plate or supporting table 30, and a cooperating upper or displaceable press plate 31, carried by a displaceable plunger element 32. The die plate for impressing the design is shown at 33, and is supported on the supporting table 30 during the pressing operation, being clamped in position and properly centered thereon by means of adjustable jaws 34. The die plate is engraved on its upper surface, as at 35, with the ornamental design to be impressed in the plastic such as that shown at 4 in Fig. 9.

In the operation of the apparatus, the plastic article 1 immediately upon being plasticized in the area to be ornamented and in the manner described above in connection with Figs. 1 to 3, is placed between the jaws 34 on the die plate 33, with the upper press plate 31 and its associated plunger 32 in the elevated position, and the plunger is thereupon quickly depressed under an applied pressure of several hundred pounds per square inch, until the engraved portions 35 of the die plate 33 are forced into the plasticized portion of article 1 to about the depth illustrated in the drawing. For example, if the die plate is engraved to a depth of about $\frac{1}{16}$ inch, it should be forced into the softened area of the plastic article to a depth of not greater than about $\frac{1}{8}$ inch. The die plate is left in the plastic, in the position shown in the drawing, for about a minute, for example, to permit the latter to cool and harden, whereupon the plunger is elevated and the plastic article withdrawn from the die. In consequence of this operation, the plastic article 1 will be ornamented in the manner illustrated at 4 of Fig. 9.

In the method above described, the design thus impressed in the plastic article will be sharp and clear in the regions of deepest penetration of the engraved die plate, but, owing to the nature of the plastic, and, in addition, due to the fact that the engraved die has not been forced into the plastic to the maximum depth of the engraving therein, the upper protuberances of the impressed design will have softly curved contours imparted thereto. Accordingly, when the protective paper coating 36 is removed from the opposite surface of the transparent plastic, and the design is inspected through this surface, it appears to display all the effects of subtle attention to detail and iridescence found only in "lalique" glassware. Also, when viewed from the surface of the plastic article into which the design is impressed, pleasing and interesting ornamental effects are obtained.

By way of a specific example with respect to the production of ornamental effects in accordance with the process above described, the following detailed information is set forth.

The heating temperature and exposure times above mentioned, may be slightly in excess of the figures above stated, where extremely intricate ornamental designs are to be impressed. Ordinarily, however, it has been found that the safest and most practical surface temperature of the heating element 10 is about 550 to 700° F., and the exposure time of the plastic article thereto about 1½ minutes, with the plastic article placed at a height of about two inches above the heating element. In most instances, this would permit the plastic material to soften sufficiently for purposes of impressing therein the most intricate designs. The surface to be ornamented will be heated to a gelatin-like consistency, under the conditions stated, down to a depth of approximately $\frac{1}{16}$ inch, while nevertheless retaining the opposite surface of the plastic and the remaining portions thereof relatively cool due to the rapidity with which the heating is applied. Where the plastic article to be impressed is thinner than ¼ inch, and is, for example, $\frac{1}{16}$ inch thick, it has been found that the application of heat under the conditions above stated for 1¼ minutes will suffice to plasticize the material to a depth of about ⅛ inch. Where heavier stock than ¼ inch is employed, the material should be subjected to the localized heating for about 2 to 2½ minutes. This will insure deep heat penetration but without blistering or discoloration of the stock.

Referring now to Figs. 5 and 6, which illustrate apparatus suitable for producing ornamental designs in plastics in accordance with the second method above described, and such as are shown in Figs. 8 and 10 of the drawings, the apparatus comprises a lower or stationary press plate 40 and an upper or displaceable press plate 41 carried by a displaceable plunger 42. The engraved die element 43 is, in this modification, impressed into the plastic to the full depth of the ornamental design engraved on the die, as indicated by the portions 44 thereof, which are disposed above the dotted line 45. In order, however, to provide concavities in the die into which the displaced excess plastic material may flow during the pressing operation, the die is more deeply engraved in its recesses or concavities, as indicated at 46, comprising the portions below the dotted line 45, which excess plastic material is ground away after the pressing operation as noted above and as explained more in detail below.

During the pressing operation, the engraved die 43 is supported on the lower press plate 40, as shown, and is closely encompassed by a suitably apertured layer of sponge rubber or the like 47, also supported on the lower press plate 40. Supported on the sponge rubber element 47 is a plane-surfaced die plate 48, which is suitably apertured, as shown at 49, in order to provide a passage therethrough for the engraved die plate 43 during the pressing operation. The thermoplastic article 50, having its upper surface protected by a layer of paper 51 adhesively secured thereto, is first heated in apparatus generally similar to Fig. 1, except for the above discussed modifications required to effect localized heating over the different pattern area now employed, until the portion of the article to be ornamented, as indicated at 52, has been sufficiently heated and plasticized. The plastic article is then placed in the pressing apparatus upon the plane-surfaced die plate 48, in the manner shown in Fig. 5, and with the upper press plate in its elevated position as indicated. It will be noted that, under these circumstances, the plastic article will be thus supported out of contact with the engraved die plate 43 due to the layer of sponge rubber 47 interposed between the plane-surfaced die plate 48 and the lower press plate 40.

The plunger 42 is thereupon quickly depressed from the position shown in Fig. 5 to that shown in Fig. 6, under a pressure of several hundred pounds per square inch, for example, thereby to force the engraved die 43 into the softened portion 52 of the plastic article to the full depth of the ornamental pattern engraved on the die, and comprising the portion above the dotted line 45. During this pressing operation, the plane-surfaced die plate 48 is depressed with respect to the engraved die 43 from the relative position shown in Fig. 5 to that shown in Fig. 6, this being insulating ring 9 in turn supports an annular heating unit 10, the detailed construction of which is illustrated in radial section in Fig. 2, and in cut-away perspective in Fig. 3.

Referring to Figs. 2 and 3, the heating unit 10 comprises an annular sheet of heat-resisting refractory material 11, such as mica, about which is helically wound a wire 12 comprising an electrical resistance heating unit, the terminals 13 of which are brought out as shown for connection to a suitable source of alternating or direct current supply. The electrical heating assembly 11, 12 is disposed between additional mica rings 14, 15, and these, in turn, are disposed between heat-conducting metal rings 16, 17, such as brass.

Reverting to Fig. 1, the heating unit 10 is supported on the heat-insulating base 9, of asbestos or the like, between a pair of concentric upstanding rings 18, 19, which likewise are composed of heat-insulating material, such as asbestos. The thermoplastic article 1 to be locally heated and plasticized as aforesaid, is supported on the upper ends of the upstanding rings 18, 19 as shown, whereby the plastic article 1 is supported some little distance away from the heating unit 10, ordinarily about an inch to two inches away, as noted below.

It will be observed that, with the arrangement above described, the heat radiated or emanating from the heating unit 10 is strictly confined by the heat-insulating rings 18, 19 to the annular surface area 2 of the plastic article 1, on which the ornamental design 4, Fig. 9, is to be impressed, so that only the annular portion 2 of article 1 is plasticized by the heat, and to a depth depending on the intensity of the heating effect and the duration for which it is applied, as referred to hereinafter.

As above stated, it is essential to the success of my process that, during the heating and plasticizing of the annular portion 2 aforesaid, all remaining portions of the article, including the opposite surface 20 thereof, be maintained at a relatively low temperature in order to retain said portions in the hard, firm state, and in order to prevent warping, marring or otherwise injuring the plastic article during the heating. To assure this result, the under side of the plastic article 1, except for the annular area 2, is heat-insulated by means of a series of spaced heat-insulating plates, such as 21, 22, of asbestos or the like, this spacing being employed for purposes of providing additional heat-insulating layers of still air, as at 23, between the successive asbestos plates 21, 22.

It is to be understood, of course, that the heating apparatus in the precise form shown in Figs. 1 to 3, would not be adapted, without modification, to confine the localized heating over the pattern area 5, Fig. 10, for example. In order to effect this, however, the only modifications necessary would be the construction of the heating unit 10 with a smaller outer diameter conforming to the diameter of the pattern area 5, Fig. 10, with a corresponding reduction in the inner dimension of the heating unit, so that it would provide a substantially uniform heating effect over an area corresponding to its outer diameter. Also, referring to Fig. 1, the inner ring 18 and interposed heat-insulating members 21 would be omitted and the outer upstanding supporting ring 19 reduced to the diameter of the heating unit modified as above stated. In other respects, the construction and operation of the heating apparatus would remain as above described. Similar and equally obvious modifications would of course be required to adjust the heating apparatus to confine the localized heating effect to other and different pattern areas than those above discussed. It is to be understood that any other appropriate type of heating equipment may be employed without departing from the spirit of my invention.

In simplified designs, in which perhaps only one design is to be impressed rather than a great number at one time, the protective asbestos sheets, such as indicated at 21, 22, Fig. 1, may be omitted, but where large designs are to be impressed, or a number of designs are to be impressed on a single sheet of plastic at one time, it is advisable to employ the protective sheets aforesaid in order to minimize the flow or seepage of heat into areas which are not to be ornamented.

As stated, preheating apparatus of the general character shown in Figs. 1 to 3 may be used in any of the several processes according to the invention, and serves the purpose of plasticizing the thermoplastic material in the areas to be ornamented, and to the desired depth to which the design is to be impressed.

With the heating apparatus arranged as in Fig. 1, the thermoplastic article 1 is subjected to a heating effect from element 10 of such predetermined degree and duration, preferably the shortest possible time, as to obtain penetration of the heat into the plastic to a depth, as indicated at 24, intended to be impressed by the engraved die. In other words, the heating effect is so adjusted as to degree and duration as to preheat the volume of plastic, as indicated at 2, 24, which is subsequently to be impressed or embossed by the engraved die plate or tool. In thus preheating the thermoplastic, the objects are: to preheat the volume 2, 24, to be impressed, almost to a gelatin-like consistency, and to accomplish this as quickly as possible while at the same time retaining all other portions, of the plastic article, including the opposite surface 20 thereof, at a relatively low temperature, and such that the thermoplastic material in these other portions remains firm, hard and free from warping or marring. For this reason, the heating must be carried out with sufficient rapidity that, under no circumstances, will the heat penetrate to the upper surface 20 of the article sufficiently to soften or mar the same.

The above objects may be accomplished, for example, by so dimensioning the heating apparatus that the plastic article 1 is spaced about one to two inches away from the heating element 10, in the manner shown in the drawing, and by applying sufficient electrical power to the heating coil 12 that the heating element assumes a surface temperature of about 550 to 700° F., and by applying his heating effect for about a minute or two, depending on the thickness of the plastic article and the required depth of heat penetration, until the volume 2, 24 thereof to be plasticized assumes, as stated, an almost gelatin-like consistency. Once this condition has been achieved, the plastic article is immediately transferred from the heating apparatus to the pressing apparatus illustrated in Fig. 4, and this apparatus thereupon actuated, as explained below, to impress the ornamental design in the heated and plasticized portion of the article, thereby to produce a pattern effect such as is illustrated at 4 of Fig. 9, for example.

To this end, the pressing apparatus comprises effected by resulting compression of the sponge rubber mat 47 interposed between the die plate 48 and the lower press plate 40.

In consequence of this pressing operation, the excess plastic material which is displaced by the engraved die 43 flows into the deep concavities, such as 46 thereof, the press plates being maintained in the position shown in Fig. 6 for several minutes until the plastic in the ornamented area has had opportunity to cool and harden. Thereupon, the plunger 42 is elevated again to the position shown in Fig. 5, and the pressed and ornamented article 50 removed from the die, at which stage it has the appearance, viewed in transverse section, as shown in Fig. 7. Referring to Fig. 7, it will be noted that, at this stage of the operation, the excess plastic material, which flowed into the deep concavities 46 of the die, now projects beyond the lower surface 53 of the plastic article, to the extent indicated at 54. This excess material 54 is now ground away to the level of the lower surface 53, and the ground portions suitably polished to give a final product as indicated in transverse section in Fig. 8, and as shown in plan view in Fig. 10, wherein the resulting ornamental pattern is designated by the numeral 5.

In this latter process, as described in connection with Figs. 5 to 8 and 10, dies may be employed which are finely, and with the greatest attention to modeling and details, engraved in relief to correspond to the depth to which the design is to be impressed into the plastic, in addition to which the background concavities or recesses of the die are engraved further an additional depth, ranging from about $\frac{1}{16}$ to as much as $\frac{1}{8}$ inch, depending on the design, in order to provide spaces for reception of the excess plastic material displaced during the pressing operation. In accordance with this process, human figures, birds, animals, flowers, and the like, showing full details as to modeling, may be faithfully reproduced in the plastic, as illustrated in Fig. 10. It is further to be noted that since, in this process, sharp-edged pattern effects are to be produced in the finished product, as indicated at 55, Fig. 8, in contrast to the smoothly curved contours resulting from the process first described, as illustrated in Fig. 4, the area to be exposed to the heating apparatus of Fig. 1 must be even more closely confined to the precise limits of the pattern area than is required in the first-mentioned process. This requirement may call for additional protection of the exposed surface, for example, by the employment of a layer of heat-insulating material, cut out to conform precisely to the pattern area of the design, and not merely permitting exposure of the general pattern area thereof.

The pressure on the die in the process illustrated in Figs. 5 and 6 may run up to about 5000 pounds per square inch, for example, in order to assure that the plastic material will flow into every contour of the die and without affecting the remainder of the plastic article. To insure that every detail of the design engraved on the die will be impressed into the plastic article, the die is, in this instance, made in two parts comprising, as illustrated in Figs. 5 and 6, the plane-surfaced die plate 48 against which the plastic article 50 is first firmly pressed, and the engraved die plate 43 which is subsequently forced into the plasticized portion 52 of the plastic article, in consequence of the pressing operation. The plane-surfaced die plate 48, which is apertured as at 49 in exact conformity with the dimensions of the engraved die 43, with sufficient clearance, however, to permit the engraved die to be displaced with respect to the plane die, prevents the excess plastic material from flowing over the outer edges of the plane-surfaced die 48, which latter acts as a retaining wall to confine the plasticized portion of article 50 within the pattern area to be ornamented and impressed by the engraved die 43, whereby extreme sharpness of detail is assured with respect to the impressed design.

Following the pressing operation, the excess material 54, Fig. 7, may be removed by the use of a rooting tool employed on a drill press and worked with a jig, whereby this excess material is smoothly ground away to the exact height of the initial surface contour 53, Fig. 8, of the article. The thus finished and ground surface may now be buffed and polished to its original clear and transparent state. Where the impressed design may be exposed to injury during these grinding and polishing operations, a layer of liquid gum arabic may be applied thereto in advance and allowed to harden before polishing or grinding. Subsequently, this protective gum arabic coating may be removed by washing out with plain water.

The ornamental designs obtained in accordance with the processes aforesaid may be enhanced or varied by coloring the deeply impressed portions, or by sand-blasting and thereupon grinding and then polishing the protuberant portions of the designs, but the effects produced are still basically the same.

It would be impossible by employment of procedures heretofore known to obtain effects such as those above described with reference to the present invention. For example, if the attempt were made to obtain the lalique-like effects illustrated in Fig. 9 by employment of the known procedure of oven-heating of the entire plastic article at 250–300° for 10 to 20 minutes in order to soften and plasticize the article throughout, followed by the impressing of an engraved die into the so plasticized article, the plastic material, under pressure of the die, would warp and blister and assume an oatmeal-like appearance or opacity, particularly over the surface area thereof opposite to that in which the impression is made. Also, the entire article would distort and change its shape or configuration under pressure of the die, owing to the rubbery-like consistency of the heated and softened plastic material.

Also, if the attempt were made to obtain by the known procedures above outlined, sharp edged, intaglio patterns, like those illustrated in Figs. 8 and 10, all of the above mentioned defects would again be encountered, in addition to which it would be found impossible by such known procedures to secure the sharp edged pattern effects above described with reference to the aforesaid figures of the drawings herein. One reason for this is that in forcing an engraved die into a surface area to be ornamented of an article which is softened and plasticized throughout as aforesaid, the die will not only depress the area of the plastic material embraced by the die, but in addition, owing to the now rubbery-like consistency of the entire article, will depress regions surrounding the die, in consequence of which a sharply delineated impression can not be obtained. Moreover, owing to this effect and the rubbery-like consistency of the entire article, the plastic material will not flow into the deeper concavities or recesses of the die, so that the article will fail to take a sharp impression thereof. It will be apparent, therefore, from the above that it is only by following the procedures described in accordance with the present invention, that ornamental effects can be obtained corresponding to the lalique-like patterns of applicant's Fig. 9, or the sharply engraved intaglio patterns of applicant's Figs. 8 and 10.

I claim:

1. In the production of ornamental designs and the like, impressed in articles made of thermoplastic resins and similar materials, the method comprising the steps of: preheating to plasticity only the surface portion thereof and only to the depth to be ornamented, while maintaining all other portions of said article, including the surface area opposite the plasticized portion, at a temperature sufficiently low to maintain all such other portions in a relatively hard and non-plasticized condition, and thereupon impressing the design in the preheated and plasticized portion.

2. In the production of ornamental designs and the like impressed in articles made of thermoplastic resins and similar materials, and by means of a die embodying the counterpart of said design, the method comprising the steps of: locally preheating only the section of said article to be ornamented and to the state of plasticity thereof, while maintaining all other portions of said article at a temperature sufficiently low as to retain all such other portions in a relatively hard and non-plasticized condition, and thereupon impressing the design into the plasticized portion by forcing said die therein, allowing the plasticized portion to cool and harden, and thereupon withdrawing said die.

3. In the production of ornamental designs and the like impressed in articles made of thermoplastic resins and similar materials, and by means of a die engraved to a depth exceeding that of said impressed design, the method comprising the steps of: locally preheating only the section of said article to be ornamented, and to the state of plasticity thereof, while maintaining all other portions of said article at a temperature sufficiently low as to retain all such other portions in a relatively hard and non-plasticized condition, thereupon forcing said die into said preheated and plasticized section but to a depth less than the depth of said die engraving, allowing said plasticized material to cool and harden, and thereupon withdrawing said die, thereby to obtain a design permanently impressed in said article having sharply delineated concavities together with soft and smoothly rounded protuberances.

4. In the production of ornamental designs and the like impressed in articles made of thermoplastic resins and similar materials, and by means of a die embodying the counterpart of said design and, in addition, having the concavities thereof engraved to a depth in excess of the depth of said design, the method comprising the steps of: locally preheating only the section of said article to be ornamented, and to the state of plasticity of said section, while maintaining all other portions of said article at a temperature and sufficiently low as to retain all such other portions in a relatively hard and non-plasticized condition, thereupon forcing said die into said plasticized section to the full depth of the design engraved in said die, whereby the excess plasticized material flows into the deeper concavities of said die, allowing the plasticized material to cool and set, and thereupon withdrawing the die and subsequently removing said excess material.

5. In the production of ornamental designs and the like impressed in articles made of transparent thermoplastic resins and similar materials, and by means of a die engraved to a depth in excess of that of said design, the method comprising the steps of: locally preheating only the section of said article to be ornamented and to the state of plasticity of the material of said section, while maintaining all other portions of said article in a relatively cool, hard and non-plasticized condition, thereupon impressing said die into said plasticized portion to a depth less than the depth of engraving in said die, allowing the material in said plasticized portion to cool and harden, and thereupon withdrawing said die, whereby a resulting design is permanently impressed in said article having sharply delineated recesses and smoothly rounded protuberances, productive of an iridescent effect on viewing the design through the opposite surface of said transparent article.

6. In the production of ornamental designs and the like impressed in articles made of transparent thermoplastic resins and similar materials, and by means of a die embodying the counterpart of said design and, in addition, embodying deeper recesses in the concavities thereof, the method comprising the steps of: locally preheating only the section of said article to be ornamented, and to the state of plasticity of the material in said section, while maintaining all other portions of said article in a relatively cool, hard and non-plasticized condition, thereupon forcing said die into said plasticized portion to the full depth of the design in said die, whereby the excess plasticized material flows into said deeper recesses of said die, allowing said plasticized material to cool and harden and thereupon withdrawing said die, and thereupon removing said excess material, whereby a resulting sharp-edged intaglio design is embodied in said article, which design presents the appearance of a cameo when viewed through the opposite surface of said transparent article.

7. The method of impressing designs in articles composed of thermoplastic resin, and by means of a die embodying the counterpart of said design, which comprises: locally heating a surface area of said article to embody said design and to the exclusion of the remaining surface area thereof, continuing said localized heating until said resin in said area has been plasticized to a depth sufficient to impress said design therein but insufficient to penetrate substantially beyond said depth, thereupon impressing said die into said plasticized portion and retaining the same therein until said portion has cooled and hardened, and thereupon withdrawing said die.

8. The method of impressing designs in articles composed of thermoplastic resin, and by means of a die embodying the counterpart of said design, which comprises: locally heating a selected surface area of said article just sufficient to embody said design, and to the substantial exclusion of the remaining surface area thereof, continuing heating of said selected surface area until the resin thereof has been plasticized to a depth sufficient to embody said design while maintaining the remaining resinous structure of said article in a substantially cool and hard condition, thereupon pressing said die into said plasticized surface to a depth somewhat less than the total depth to which the design is embodied in said die, whereby the plasticized resin which is displaced by the protuberances of said die may flow into the concavities thereof, allowing the die to remain in this position until said plasticized resinous portion has cooled and hardened, and thereupon withdrawing said die.

9. The method of producing intaglio designs in articles made of a thermoplastic resin, and by means of a die embodying the counterpart of said design, and also embodying between the design protuberances cavities extending to a depth in excess of the depth of said design, said method comprising: locally heating a selected surface area of said article which is confined to the pattern area, and to the substantial exclusion of the remaining surface area of said article, continuing said local heating until said selected surface area has been plasticized to a depth sufficient to impress said design therein, thereupon impressing said die into said plasticized area to a depth sufficient to impress said design therein, whereby the excess and displaced resinous material flows into said cavity-like portions of said die to provide portions which project beyond the initial surface contour of said article, allowing said die to remain in this position until said plasticized resin portion has cooled and hardened, thereupon withdrawing the die and removing said projecting resin portions substantially to the initial surface contour of said article.

ALFRED A. FLASTER.

REFERENCES CITED

The following references are of record in the file of this patent:

UNITED STATES PATENTS

| Number | Name | Date |
| --- | --- | --- |
| 1,161,614 | Clark | Nov. 23, 1915 |
| 1,921,456 | De Laney | Aug. 8, 1933 |
| 2,030,066 | Jenett | Feb. 11, 1936 |
| 2,143,243 | Hirschman et al. | Jan. 10, 1939 |
| 2,282,423 | Kopitke | May 12, 1942 |
| 2,354,714 | Strickland | Aug. 1, 1944 |
| 2,368,085 | Barbieri | Jan. 30, 1945 |
| 2,376,655 | Brotz | May 22, 1945 |
| 2,406,714 | Strickland | Aug. 27, 1946 |